United States Patent [19]
Ovshinsky et al.

[11] Patent Number: 5,032,193
[45] Date of Patent: Jul. 16, 1991

[54] METHOD OF MAKING SYNTHETICALLY ENGINEERED MATERIALS

[75] Inventors: Stanford R. Ovshinsky, Bloomfield Hills; Stephen J. Hudgens, Southfield, both of Mich.

[73] Assignee: Energy Conversion Devices, Inc., Troy, Mich.

[21] Appl. No.: 468,298

[22] Filed: Jan. 22, 1990

Related U.S. Application Data

[63] Continuation of Ser. No. 312,003, Feb. 16, 1989, abandoned, which is a continuation of Ser. No. 75,461, Jul. 20, 1987, abandoned, which is a continuation of Ser. No. 820,842, Jan. 21, 1986, abandoned.

[51] Int. Cl.$^5$ .......................... C23C 10/02; C23C 8/02
[52] U.S. Cl. ........................ 148/242; 427/34; 427/38; 427/39; 264/82; 264/164
[58] Field of Search .......................... 427/38, 39, 34, 35, 427/36, 53.1, 54.1; 264/1.1, 1.2, 1.3, 1.4, 1.5, 1.6, 1.7, 10, 12, 82, 164; 65/32, 66, 83, 121, 137, 145, 157; 501/42, 53, 54, 64, 73, 78; 357/2, 4, 61; 136/258; 148/1.5, 242

[56] References Cited

U.S. PATENT DOCUMENTS

| | | | |
|---|---|---|---|
| 3,275,408 | 9/1966 | Winterburn | 427/34 |
| 3,593,775 | 7/1971 | Privott | 425/378.2 |
| 3,975,184 | 8/1976 | Akers | 264/10 |
| 4,177,474 | 12/1979 | Ovshinsky | 357/2 |
| 4,178,415 | 12/1979 | Ovshinsky | 357/2 |
| 4,217,374 | 8/1980 | Ovshinsky | 357/2 |
| 4,226,898 | 10/1980 | Ovshinsky | 352/7 |
| 4,339,255 | 7/1982 | Ovshinsky | 427/39 |
| 4,417,911 | 11/1983 | Cundy | 427/39 |
| 4,587,065 | 5/1986 | Kouichi | 264/1.5 |
| 4,613,371 | 9/1986 | Cheney | 264/DIG. 72 |

*Primary Examiner*—Jay H. Woo
*Assistant Examiner*—Jeremiah F. Durkin, II
*Attorney, Agent, or Firm*—Krass & Young

[57] ABSTRACT

A process for fabricating synthetic materials, such as "atomic ceramics", by atomic alloying of a host material. Energetic modifier elements or species are introduced into the host matrix of a fluidic precursor material so as to obtain an engineered material characterized by a range of optical electrical, thermal, chemical or mechanical properties not exhibited by either the modifier or the precursor material. In this manner modified, layered, graded, doped and/or alloyed materials may be synthesized. Special emphasis is placed on a novel technique for the synthesis of optical fibers.

42 Claims, 7 Drawing Sheets

METHOD OF MAKING SYNTHETICALLY ENGINEERED MATERIALS

This application is a continuation of Ser. No. 07/312,003, filed on Feb. 16, 1989, now abandoned, which is a continuation of Ser. No. 07/075,461, filed July 20, 1987, now abandoned, which is a continuation of Ser. No. 06/820,842, filed Jan. 21, 1986, now abandoned.

FIELD OF THE INVENTION

This invention relates generally to synthetically engineered materials and more particularly to a process for the fabrication of novel classes of materials in which at least one of the precursor components is synthesized from an energetic species so that the resultant materials exhibit a range of mechanical, chemical, optical, thermal and electrical properties heretofore unattainable in the naturally-occurring analogs thereof.

BACKGROUND OF THE INVENTION

The instant invention is predicated upon the world's need for materials which possess a range of characteristics not present in naturally-occuring materials. Only through the synthetic engineering of uniquely propertied materials, can technological progress be freed from the constraints previously imposed by such natural materials. The basis for the innovation discussed hereinafter is the destruction of these constraints which, until recently, had led to relatively limited usable ranges of thermal, electrical, optical, structural and chemical characteristics obtainable from any single one of such natural materials. Now that the constraints of nature's symmetry have been destroyed, the fabrication of materials having nonstoichiometric compositions, unique orbital configurations and variant bonding becomes possible. Such deviant compositions and configuration provide for the synthesis of new materials which emphasize unlimited combinations of desired properties.

The essence of the present invention is to provide a process by which to fabricate synthetic materials which are thereby particularly tailored to accomplish any desired task. In order to accomplish such an ambitious goal, it is necessary to introduce component species which have been excited to an energetic state into the host matrix of a base material by a novel fabrication process in which the synthetically engineered electronic and chemical bonding configurations of those species in that host matrix are altered and permanently preserved. It should be noted that the term "component" or "component material" as used herein refers to any species which participates in the interactions leading to the final synthetically engineered material, regardless of whether that species is physically present in the final product. Components can include inter-alia, inert gases or other species which transfer energy to, or otherwise influence the formation of the material.

One set of methods for the fabrication of synthetic materials, which prior art synthetic materials are characterized by a range of chemical, optical, thermal, electrical and physical properties (albeit a limited range) not present in naturally occurring materials, has previously been described in "rapid quenching" literature. By rapidly quenching precursor material from a non-solid state, certain non-equilibrium states and local bonding orders characteristic of the precursor material state can be preserved in the quenched state. In contrast, the same precursor material, more slowly cooled from a non-solid to a solid state, will form a material which does not exhibit the non-equilibrium states and local bonding orders possible for the rapidly quenched material. Typically, the non-equilibrium state material produced by rapid quenching will contain at least some phases characterized by disordered, amorphous, microcrystalline, or polycrystalline structures, with possible crystalline inclusions. Since the properties of the materials produced by rapid quenching are different from those of slowly cooled materials, high quench rate processes have found commercial application in the production of bulk and thin film amorphous and disordered materials exhibiting desirable, novel properties.

Rapid quench techniques have heretofore been used to incorporate one or more "modifying" elements into the host matrix of a preselected material, thereby providing for the possible alteration of one or more of the physical, chemical, thermal, electrical or optical properties of that host material in a preselected manner. Hopefully, said alteration could be accomplished without adversely affecting other properties which, in naturally occurring or unmodified materials, are seemingly interrelated to and dependent upon the altered properties. This principle will be referred to hereinafter as "modification". In other words, modification will be defined, for purposes of the instant invention, as the introduction of a modifying species into the host matrix of a precursor material for the purpose of uncoupling otherwise interrelated properties of that host matrix material. In the preferred definition, and as detailed hereinafter, modification will affect at least the electronic configurations of the host matrix material.

While rapid quenching has been discussed hereinabove, it is to be noted that various other methods are available by by which modifying elements or species can be added to the host matrix of a precursor material. For instance, modified amorphous materials have heretofore been made by, e.g. thin film processes, chemical vapor deposition, sputtering and cosputtering, glow discharge, and microwave glow discharge. These methods of modification, the modified materials obtained thereby and the unique properties attained by modification are described in, for example, U.S. Pat. No. 4,177,473 to Stanford R. Ovshinsky for Amorphous Semiconductor Member and Method of Making the Same; U.S. Pat. No. 4,177,474 Stanford R. Ovshinsky for High Temperature Amorphous Semiconductor Member and Method of Making the Same; U.S. Pat. No. 4,178,415 to Stanford R. Ovshinsky and Krishna Sapru for Modified Amorphous Semiconductors and Method of Making the Same; U.S. Pat. No. 4,217,374 to Stanford R. Ovshinsky and Masatsuga Izu for Amorphous Semiconductors Equivalent to Crystalline Semiconductors Produced by a Glow Discharge Process; and U.S. Pat. No. 4,520,039 to Stanford R. Ovshinsky for Compositionally Varied Materials and Methods for Synthesizing the Materials.

The modified materials disclosed in the aforementioned patents are formed in a solid amorphous host matrix having structural configurations which have local rather than long range order. In a like manner and according to the principles disclosed therein, a modifier species may be added to the host matrix of the precursor material, said species having orbitals which interact with the orbitals of the host matrix. This interaction results in the substantial modification of the electronic configurations of the host matrix of the precursor material. The materials produced as a result of said orbital interaction have, on the atomic or microscopic level, atomic configurations which have been substantially changed to provide, e.g., independently increased electrical conductivity without corresponding changes in thermal conductivity. The resultant materials exhibit both chemical and structural modification, both type of modification resulting in properties characteristic of non-equilibrium materials with modified local orders, structures and configurations.

Of particular interest relative to the instant invention is a disclosure relating to the modification of the host matrix of precursor materials by melt spinning process, said disclosure found in U.S. Pat. No. 4,339,255 to Stanford R. Ovshinsky and Richard A. Flasck for Method and Apparatus for Making a Modified Amorphous Glass Material (said patent assigned to the assignee of the instant invention). This '255 patent describes a method and apparatus for introducing a fluidic modifier into a host matrix, said fluidic modifier optionally containing one or more active gases, such as oxygen, nitrogen, silicon tetrafluoride, or arsine. The synthetic materials made by the disclosed process can be metallic, dielectric, or semiconductor modified amorphous glass materials. The modified synthetic materials can range from alloys, to materials with varying degrees of alloying and modification, to materials in which only modification and doping actions exist. While the '255 patented method provides for the modifier species to be incorporated at various intervals or layers, at different rates and in different sequences; the number of species incorporated, the number and interval of layers and the rates and sequence of introduction are limited.

It is noteworthy that through the utilization of the method described in U.S. Pat. No. 4,339,255 it is even possible to produce modified ceramic materials, i.e., ceramic materials exhibiting properties not naturally occurring in normally prepared material. Also, since the interaction between the modifier material and the precursor material from which the host matrix is formed does not take place in a crucible where the materials are liquidified, but rather on the surface of a melt spinning chill wheel, the material thereby produced can be of a composite structure, of a modulated structure, or even of a layered structure.

While the method disclosed in U.S. Pat. No. 4,339,255 does permit the fabrication of modified ceramic materials, the process utilized to make the resultant material is that of melt spinning onto the peripheral surface of a chill wheel. As described hereinabove, melt spinning is a rapid quench process and can have quench rates as high as $10^8$ degrees Centigrade per second. However, melt spinning is actually one of the slower rapid quench techniques, especially when compared to more rapid techniques such as sputtering. Therefore, it has heretofore not been possible to produce modified bulk materials at the higher range of quench rates. it would, of course, be desirable (for production purposes, as well as for the fabrication of the highest quality modified materials) to fabricate modified bulk materials at very high quench rates, since the resultant materials would be characterized by a range of properties unobtainable because of the lower quench rate limitations of melt spun processes.

Therefore, the instant invention relates to innovative fabrication techniques for the synthesis of novel classes of modified materials, which techniques do not sulfur from any of the limitations imposed by the Flasck '255 process or by any other of the heretofore developed rapid quench processes. More particularly, the Flasck '255 process is limited to the fabrication of relatively thin film materials, to the formation of a limited number (one, two or three) of layers of those thin film materials and to a single host matrix precursor material in each layer thereof. The '255 process also does not provide for the use of a core member upon which is deposit those modified thin film materials.

Additionally, while the '255 patent does disclose the fabrication of modified dielectric materials, the melt spinning process used therein permits only a rather limited rate of diffusion of the modifier species into the host matrix. Thus, it is not possible to use the method disclosed in that patent to fabricate one class of extremely useful materials, the class of ceramic materials whose properties are modified on an atomic level. Such "atomic ceramics" may exhibit combinations of properties heretofore unknown in nature or in conventionally or exotically fabricated analogs.

In contrast to said heretofore developed rapid quench processes, the instant invention provides for the fabrication of synthetically engineered materials having a liquified metallic, semiconductor or ceramic host matrix into which energetic modifying elements are introduced. Due to the fact that the fabrication process of the instant invention may be repeatably cycled with a variety of host matrix precursors, successively deposited layers of the host matrix may be repeatably changed with the same modifier or sequentially changed with varying modifiers to develop either a multilayered, compositionally varied body of bulk material or a single homogenous body of bulk material which can be built to relatively thick dimensions. Also, the modified material may be deposited upon an externally engineered core member which is drawn through a series of deposition stations. Finally, because the process of the instant invention requires the interaction of the host matrix of the precursor material and the modifier material to occur during exposure to the atmosphere and while the modifier material is maintained in an activated state, both high quench rates and high diffusion rates are obtained. By incorporating the energetic modifier species into the host matrix at high diffusion rates, it becomes possible to fabricate a truly atomically alloyed ceramic material.

These and other objects and advantages of the instant invention will becomes apparent from the drawings, the detailed description and the claims which follow.

BRIEF SUMMARY OF THE INVENTION

There is disclosed herein a method of fabrication a synthetically engineered solid material, said method comprising the steps of: providing a fluidic stream of a first component of the materials; subjecting the fluidic stream of the first component to an energized diffusable second component of the material; and diffusing said second component through at least a portion of the fluidic stream. In this manner, the second component interacts with the first component so as to form a synthetically engineered solid material exhibiting a range of properties different from the properties of either individual component. The fluidic stream of the first component is preferably liquid and formed of a material chosen from the groups consisting essentially of a metallic material, a semiconductor material, a semi-metallic material, a ceramic material, and combinations thereof. Preferably, a stream of an energized gaseous material is directed to impinge upon the fluidic stream of the first component, said gaseous material selected from the group consisting essentially of nitrogen, oxygen, halogens, hydrocarbon gases, inert gases, hydrogen, vaporized alkaline metals, and combinations thereof. The second component may be energized by forming a plasma therefrom, by ionizing the second component, by radicalizing the second component, by thermally activating the second component, by photoactivating the second component, by catalytically activating the second component, or by utilizing a high pressure environment.

The energized gaseous stream is brought into contact with the fluidic stream of the first component substantially in the direction of movement in the first component so that momentum is transferred from said gaseous stream to said fluidic stream of said first component. The contact between the two streams is maintained for a significant length of time to attain the desired degree of diffusion. In a preferred embodiment, the first component is liquified in the crucible and ejected from the crucible in a fluidic stream. The ejection can take the form of ejection from a nozzle under pressure. In another embodiment, the first component may overflow from the top of the crucible. The aperture formed in the crucible may be regularly shaped, such as circularly-shaped or square-shaped in cross-sectional configuration; or the aperture may be irregularly shaped, such as bow tie-shaped or I-beam shaped in cross-sectional configuration.

The fluidic stream of the first component is preferably subjected to additional energy for enhancing the diffusion of the second component through a portion of the bulk of the host matrix of the first component, e.g., by pulsing energy through the fluidic stream to form eddy currents therein. The external energy may be provided by electrical energy, magnetic energy, thermal energy or optical energy. Additional fluidic streams of additional precursor components may be directed into contact with the fluidic stream of the first component. The third or additional components may be either sequentially or simultaneously directed into contact with the first component. A quenched surface may be utilized to freeze the properties of the modified material after the interaction of the components has been completed. A core member, upon which to deposit the layers of modified synthetically engineered bulk material, may be used. AC energy, microwave energy, RF energy or DC energy may be utilized to form the plasma which activates the second component.

There is also disclosed herein a method of fabricating a relatively thick synthetically engineered solid material, said method including a steps of: providing a core member; directing said core member through at least one deposition station adapted to perform the operations of providing a fluidic stream of the first component of the synthetically engineered material; subjecting the fluidic stream of the first component to an energized diffusable second component of the material; and diffusing the second component through at least a portion of the fluidic stream. In this manner, the second component is directed into contact with the first component so as to deposit a layer of a synthetically engineered solid material, exhibiting a range of properties different from the properties of either individual component, upon the core. The core is preferably formed of a material of a composition analogous to the composition of the material from which the synthetically engineered solid material is formed. Preferably, a plurality of deposition stations are provided and the core is sequentially directed through said plurality of deposition stations. The fluidic stream of the first component is preferably a liquid stream formed of an atomized metallic material, an atomized semiconductor material or an atomized ceramic material. The second component is brought into contact with the fluidic stream of the first component by utilizing a stream of energized gaseous material. The energized gaseous material is selected from the group consisting essentially of nitrogen, oxygen, halogens, hydrocarbon gases, inert gases, hydrogen, vaporized alkaline metals, and combinations thereof.

Energization of the second component can be accomplished by a plasma, by ionization of the second component, by radicalization of the second component, by thermal activation of the second component, by photoactivation of the second component, by catalytic activation of the second component or by utilizing a high pressure environment. The core member may be specifically adapted to function as a template for the accretion of subsequent layers of synthetically engineered solid materials thereupon. The energized gaseous stream is directed to impinge upon the fluidic stream of the first component so that momentum from the gaseous stream is transferred to said fluidic stream of the first component. The first and second streams are maintained in contact for a sufficient length of time to obtain a high degree of diffusion.

Preferably the first component is liquified in a crucible and then ejected from the crucible in said fluidic stream. The first component can also be ejected from the crucible through a nozzle under pressure, or by allowing the first component to overflow from said crucible. Again, the aperture in the crucible may be either regularly or irregularly shaped. However, in the subject embodiment, it is necessary that the subsequently deposited layers of synthetically engineered material be ejected from an aperture shaped to produce a finished article of the predetermined cross-sectional shape.

The fluidic stream of said first component may be subjected to a burst of energy for enhancing the diffusion of the second component through the host matrix of the first component. The energy may be electromagnetic, thermal or of other origin as long as, e.g. eddy currents or other agitation of the first (etc.) stream is provided. Energized, diffusable third, forth, fifth components of the synthetically engineered material may also be provided, in which case the fluidic stream of said first component is exposed to the second, third, fourth, fifth (etc.) energized diffusable components prior to quenching. Only after interacting with said second and additional components, may said modified material be deposited onto a quench surface for freezing the properties into said material.

The synthetically engineered solid material may be formed as an elongated fiber which is collected upon a take-up spool. The take-up spool can provide a biasing force along the longitudinal direction of movement of said fiber for facilitating the passage of the fiber through the plurality of deposition stations.

Also disclosed is a novel method of fabricating optically transmissive fibers, said method including the steps of providing a fluidic stream of a first component selected from one or more Group IV elements, and subjecting the fluidic stream to energized oxygen. The energized oxygen is then diffused through at least a portion of the fluidic stream. In this manner the oxygen interacts with the first component to form a synthetically engineered optically transmissive fiber. The first component of the fluidic stream comprises a member selected from the group consisting essentially of silicon, germanium, and compounds, combination, and mixtures thereof. The fluidic stream may also includes an additional multivalent metal therein. The method may include the further step of subjecting the fluidic stream to an energized third component containing one or more elements selected from the group consisting essentially of halogens, multivalent metals, nitrogen and alkaline metals.

Also disclosed is a method of fabricating a synthetically engineered solid material, said method comprising the steps of: providing a moving surface; contacting at least a portion of the moving surface with a fluidic first component of the material; contacting the first component portion of the moving surface with a fluidic second component of the material; and catalytically introducing an energized third component of the material, said material adapted to diffuse into a component selected from the group consisting essentially of (1) the first component, (2) the second component and (3) the first and second components. As the third component diffuses through and catalytically interacts with the selected component, it forms the synthetically engineered solid material, which material exhibits a range of properties different from the generation of any individual component thereof.

The moving surface may take the form of e.g., a moving belt, the surface of a drum, or a rotating wheel. Either one or both of the first and second fluidic components may form part of a fluidic stream, which stream has been melted and ejected from a crucible. Alternatively, either one or both of the first and second fluidic components may be provided as an immersible bath or a spray. Alternatively, a plurality of moving surfaces may be provided in a multi-deposition-step process.

The energized third component may be catalytically introduced to diffuse into the first component as or after it comes into contact with a portion of the moving surface. Alternatively, the energized third component may be catalytically introduced into the fluidic second component of the material before or as it comes into contact with the first component portion of the moving surface. Alternatively, the energized third component may be catalytically introduced to both the fluidic first and second components after they have contacted each other.

BRIEF DESCRIPTION OF THE DRAWINGS

in FIG. 7A microwave horns are employed, in FIG. 7B r.f. powered electrodes are employed, in FIG. 7C inductive heating coils are employed and in FIG. 7D photoactivating lamps are employed.

DETAILED DESCRIPTION OF THE INVENTION

I. THE SYNTHESIS OF A SINGLE LAYER

Figure 1:
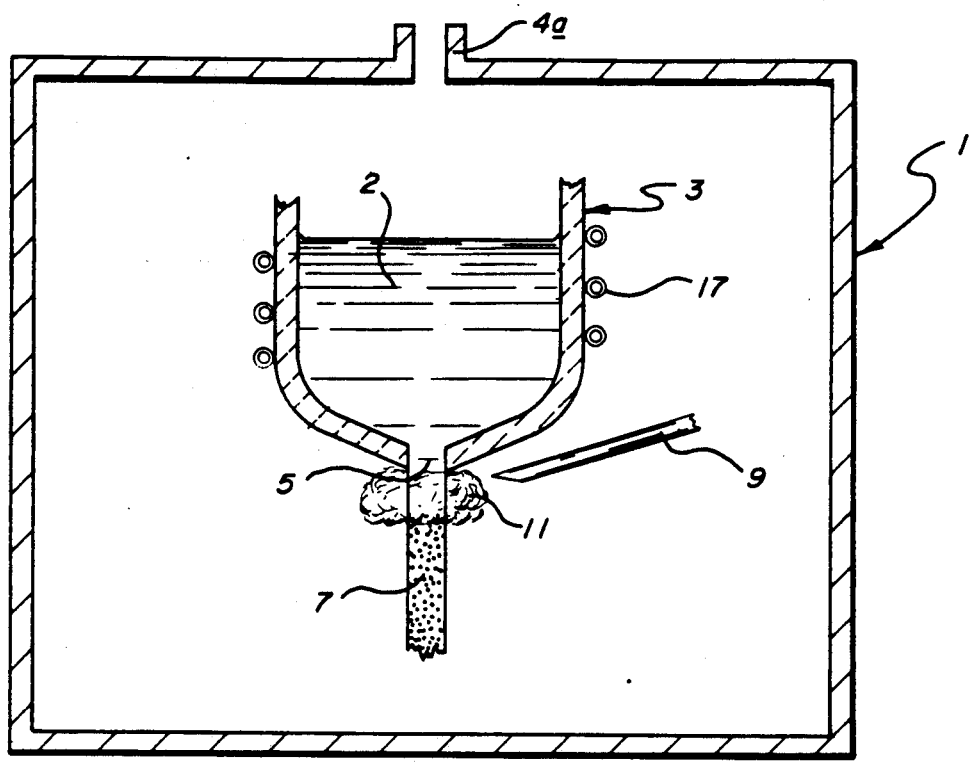
FIG. 1 is a schematic, cross-sectional view of liquified material streaming forth from an aperture formed in the bottom surface of a crucible, said liquified material subjected to a diffusable energized modifier material.

The method of the instant invention may be more particularaly understood in view of the detailed description which follows with appropriate reference in the drawings. FIG. 1 shows a deposition station generally depicted by the reference numeral 1, said station adapted to fabricate a synthetically engineered material. More particularly, the deposition station 1 has a crucible 3 associated therewith in which a first component of a precursor material (from which the host matrix is formed) can be liquified as by inductive heating coils to form a liquified first component 2 and discharged through an aperture 5 formed in the bottom surface thereeof. The liquified first component 2 may then form a fluidic stream 7, which stream is ejected through the regular or irregularly-shaped aperture 5. Also associated with the deposition station 1 is a nozzle 9 from which is discharged an energized, diffusable second component of the material to be synthesized, thereby forming a readily diffussable stream 11 of the second component of the engineered material. As detailed hereinafter, it is essential that the second component be introduced to the fluidic stream of the first component in as highly active state.

According to one embodiment of the present invention, the first component of the synthetically engineered material, which component may comprise metallic, semiconductor, or ceramic material, is melted within the crucible 3. Melting may be accomplished by resistive heating, inductive heating or any other technique which will not add impurities to liquified material. In some instances, the first component will normally be a liquid and consequently no or little external heat need be applied. Regardless of its room temperature state, the now liquified first component 2 is discharged from the crucible 3, through aperture 5, thereby forming a liquid fluidic stream 7 emanating therefrom. It is noteworthy that the first component will be a lower melting temperature material than the material from which the cruicible is fabricated. Only in this manner is it possible to prevent impurities associated with the crucible from contaminating the liquid stream.

The fluidic stream 7 of the first component of the engineered material is then subjected to the energized second component of that engineered material. Energization of the second component may be accomplished by the input of electrical, photo-optical, magnetic, photochemical, chemical or thermal energy to that component. For example, the second component may be exposed to an electromagnetic energy field such as a microwave, radio frequency or other alternating current field. It may similarly be energized by a D. C. field so as to form an excited plasma. Energization may be photochemical, i.e., the component is irradiated with the appropriate wavelength of light to produce excited species therefrom. Thermal energy may similarly be used for the production of excited species from the second species. In some cases catalytic activation may be employed; as for example, molecular hydrogen gas may be brought into contact with platinum or another catalytic material to produce energized atomic hydrogen. More specific illustrations and descriptions of the various energization structures will be provided hereinbelow with specific reference to FIGS. 7A-7D. Note that for purposes of simplifying the initial explanation of the inventive concepts, it is to be assumed that activation occurs internally of nozzles 9 so that energized species are ejected therefrom.

Regardless of the method employed, exictation of the second component will produce ions, radicals, molecular fragments, and/or stimulated neutral species therefrom. As used herein, the term "energized species" will refer to any atom, molecule or fragment thereof having its reactivity increased, such increase being without regard to the manner in which said increase occurs. Further, the second component may be exposed to the activating energy or catalytic material at a point remote from the nozzle 9 or even within the nozzle itself. For example, a source of electromagnetic energy such as an electrode, waveguide or spark gap can be included within the structure of the nozzle. The important aspect of activation is that the species remain energized until the downstream diffusion with the host matrix of the second component has been completed.

The energized, diffusable second component is discharged through nozzle 9 in close proximity to the fluidic stream 7 emanating from the crucible 3, thereby forming an activated region, e.g., a plasma of activated species 11 which substantially surrounds the fluidic stream 7. The second component, because of its activated state and the molten state of the first component, readily diffuses into and interacts with the fluidic stream 7, so that, when cooled, a synthetically engineered solid material exhibiting a range of properties different from the properties of either component thereof is formed.

As illustrated in FIG. 1, the deposition apparatus is enclosed in a chamber 4. This chamber is not necessary for all fabrication processes; however, in many instances it may be desirable to carry out the fabrication of specific synthetically engineered materials in a controlled environment. For example, the chamber 4, may be filled with an inert gas such as argon for the purpose of shielding the fluidic streams from atmospheric contaminants. In other instances, the chamber 4 may be evacuated through pressure line 4a to accomplish the same objective. In still further instances, the reaction and/or diffusion of the components may be facilitated by conducting the process in a pressurized atmosphere and at elevated temperatures. Of course, an elevated ambient temperature would maintain the liquid state of the first component for longer periods of time.

Figure 2:
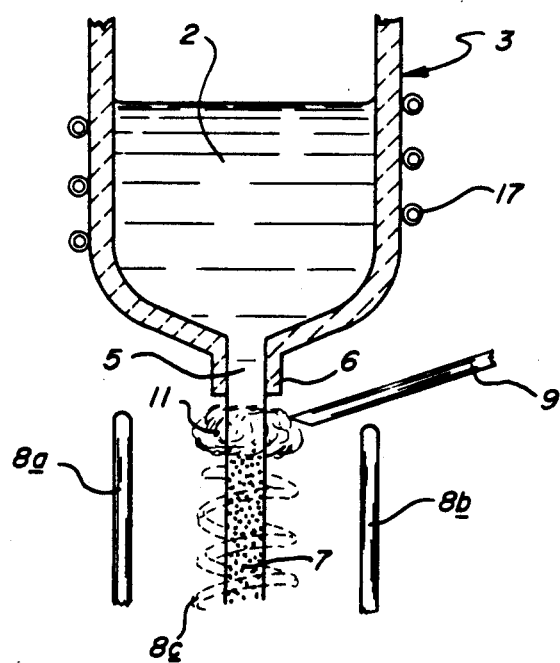
FIG. 2 is a schematic, cross-sectional view of the crucible and stream of liquified material illustrated in FIG. 1 and further depicting the utilization of electromagnetic energy to establish eddy currents for promoting the diffusion of said energized modifier material into the most matrix of said liquidified material.

In another preferred embodiment, shown in FIG. 2, the liquified first component 2 of the engineered material is discharged through a nozzle 6, which nozzle forms a part of the crucible 3 and which substantially surrounds the aperture 5 formed in the bottom surface thereof. It is from this nozzle 6 that the fluidic stream 7 is ejected from the crucible 3. The fluidic stream 7 may be optionally discharged from the crucible under pressure. In the FIG. 2 embodiment, a source of electromagnetic energy, such as spaced electrodes 8a and 8b coupled to a source of r.f. energy provide bursts of energy to the fluidic stream 7 discharged from the crucible 3. Alteratively, an r.f. frequency induction coil 8c (shown in phantom) may be configured to substantially surround said fluidic stream 7 at a position downstream of its discharge from the nozzle 6. The spaced electrodes of the induction coil provide additional energy for enhancing the reactivity and diffusion of the second component into the first component of the synthetically engineered material. Additionally, the induction coil or spaced electrodes may be employed to create eddy currents within the fluidic stream, which currents serve to stir or mix the molten material, thereby maintaining its reactive nature and promoting its homogeneous reaction with the second component. In an alternate embodiment, said eddy currents can be provided by the use of a magnetic field imposed across said fluidic stream 7 whereby motion of the stream and/or motion of the magnets operate to create the requisite forces by which the eddy currents are initiated and sustained.

In some instances it would be desirable to include an additional electrode (not shown) proximate the molten stream 7 for purposes of enhancing mobility of selected ions of the activated second component into the stream. In some cases, the material forming the fluidic stream 7 will be of sufficiently high conductivity to enable it to be directly biased so as to promote migration of ions thereinto, said stream providing an electrolyte for the ions to move in. Regardless of the manner in which the additional energy is supplied, an energized, diffusable second component of the engineered material is simultaneously discharged from the nozzle 9, as previously described with reference to FIG. 1 and the fluidic stream 7 of the first component 2 is subjected to the diffusing effects of that second component 11 to form the body of synthetically engineered material.

In the preferred embodiment of the invention illustrated in FIG. 2, the molten first component 2 of the engineered material is discharged from the crucible 3 through the nozzle 6, under pressure, thereby forming the fluidic stream 7. Energy pulses emanating from the r.f. powered electrodes 8a and 8b create the aforementioned eddy currents in said fluidic stream 7. In this manner, the fluidic stream 7 is maintained in an excited state while it is being exposed to the plasma 11 formed of the energized, diffusable second component of the engineered material. The eddy currents in the fluidic stream 7 promote more rapid diffusion of the energized, diffusable second component thereinto, thereby permitting more uniform and homogeneous modification of the host material. Further, the resultant synthetically engineered solid material will exhibit a correspondingly greater degree of homogeneity and uniformity with respect to material properties.

Figure 3:
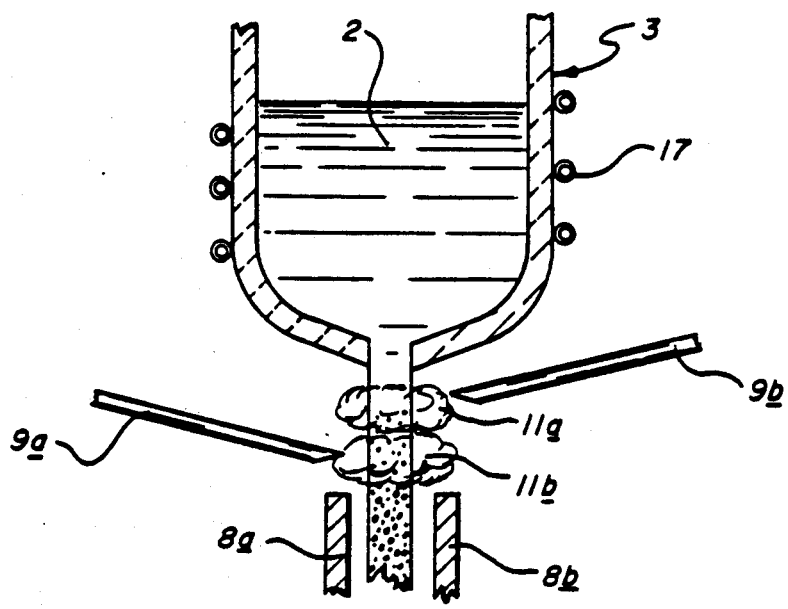
FIG. 3 is a schematic, cross sectional view of the crucible and stream of liquified material illustrated in FIG. 1 and further depicting two diffusable energized modifier materials brought into contact with the storage of liquified material.

An alternative preferred examplification of the invention is illustrated in FIG. 3. In FIG. 3 there is depicted a first nozzle 9a through which is discharged an energized stream of an energized, diffusable second component of the engineered material. However, in contrast to the previous figures, a second nozzle 9b is provided to discharge an energized fluidic stream of a third energized, diffusable component of the engineered material. In operation, the fluidic stream 7 of the first component ejected from the crucible 3 is formed as described above and discharged through regularly or irregularly shaped aperture 5. After said discharge, said fluidic stream is contacted by the plasma 11a formed of the energized second component and a plasma 11b formed of the energized, diffusable third component, thereby forming a synthetically engineered solid material which has been modified by the diffusion and interaction with both the second and third components. While only two diffusable modifiers have been illustrated, it should be understood that additional nozzles can be provided for supplying additional energized modifiers to the fluidic stream formed of the first component. In some instances additional nozzles may be employed to provide unenergized components to the fluid stream for purposes of interacting with, heating, cooling or modifying the material being fabricated. In those instances where the second component is sufficiently reactive, it will be energized chemically by contact with the fluid stream 7 and accordingly no external activation of energization need be employed.

It should be further be appreciated that in the in the particularly preferred embodiments illustrated in the Figures, the fluidic stream 7 is sequentially subjected to the second and then to the third component. However, in other particularly preferred embodiments, the fluidic stream 7 may be simultaneously subjected to the energized second and third components. The simultaneous or sequential interaction of the components will vary in accordance with the desired modifying, grading, doping or alloying to be effected in the final engineered material.

Figure 4A:
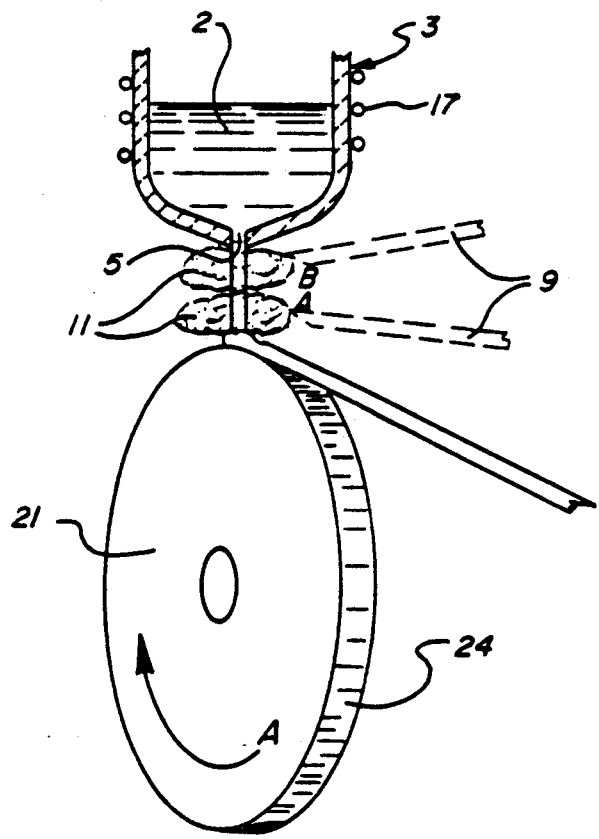
FIG. 4A is a schematic, partially perspective and partially cross-sectional view of liquified material streaming forth from an aperture formed in the bottom surface of a crucible, said liquified material subjected to at least one energized modifier which is adapted to diffuse into the host matrix of the liquified material, said modified liquified material deposited upon the peripheral surface of a chill wheel.

FIG. 4A illustrates still another preferred embodiment of the instant invention, which embodiment includes a quench surface for the rapid solidification of the synthetically engineered material. The apparatus of FIG. 4A includes the crucible 3, which crucible is generally similar to the crucible illustrated and described in the foregoing examples. As illustrated, the crucible 3 is provided with an inductive heating coil 17 for the purpose of melting the first component 2 of the engineered material therein. As mentioned previously, other non-contaminating methods of heating, such as resistive or radiant heating, could be similarly employed. Also included is a nozzle 9, generally similar to the nozzles depicted in and described with reference to the previous figures, said nozzle adapted to discharge and energize the diffusable second component of the engineered material in a plasma-like state 11. The nozzle 9 is shown in FIG. 4, in phantom outline, as ejecting the second component either at a location A proximate the surface of the wheel 21 or at a location B more remote from the surface of that wheel. The point at which the second component interacts with the first component stream 7 determines the degree of diffusion which will occur.

Where the apparatus of FIG. 4A differs from the aforedescribed apparatus is in the inclusion of a chill wheel 21 for the purpose of rapidly quenching the modified stream into a permanently engineered material. Typically, the chill wheel 21 is formed from a high thermal conductivity material such as copper or aluminum and is rotated rapidly during the material fabrication process to assist in drawing out and cooling said material.

As shown in FIG. 4A, a fluidic stream 7 of the first component of the engineered material is directed onto the peripheral surface of the chill wheel 21 from the crucible 3. The first component stream 7 is subjected to the effect of the energized second component of the engineered material. In one embodiment, the second component is projected from the nozzle 9 at a point substantially aligned with the point of introduction of the first component onto the chill wheel 21 (location A). The second component diffuses into and interacts with the first component to produce the synthetically engineered material, which material is rapidly solidified by the conduction of heat therefrom to the chill wheel. Further, the rotational force of the wheel serves the additional function of propelling the thus prepared body of engineered material off the peripheral surface 24 of the chill wheel 21. In a second embodiment, FIG. 4A depicts the second component plasma 11 as interacting with the first component at a point more remote from the point at which the first component is introduced to the chill wheel (location B).

II. SURFACE REACTION FROM A BATH OR SPRAY

Figure 4B:
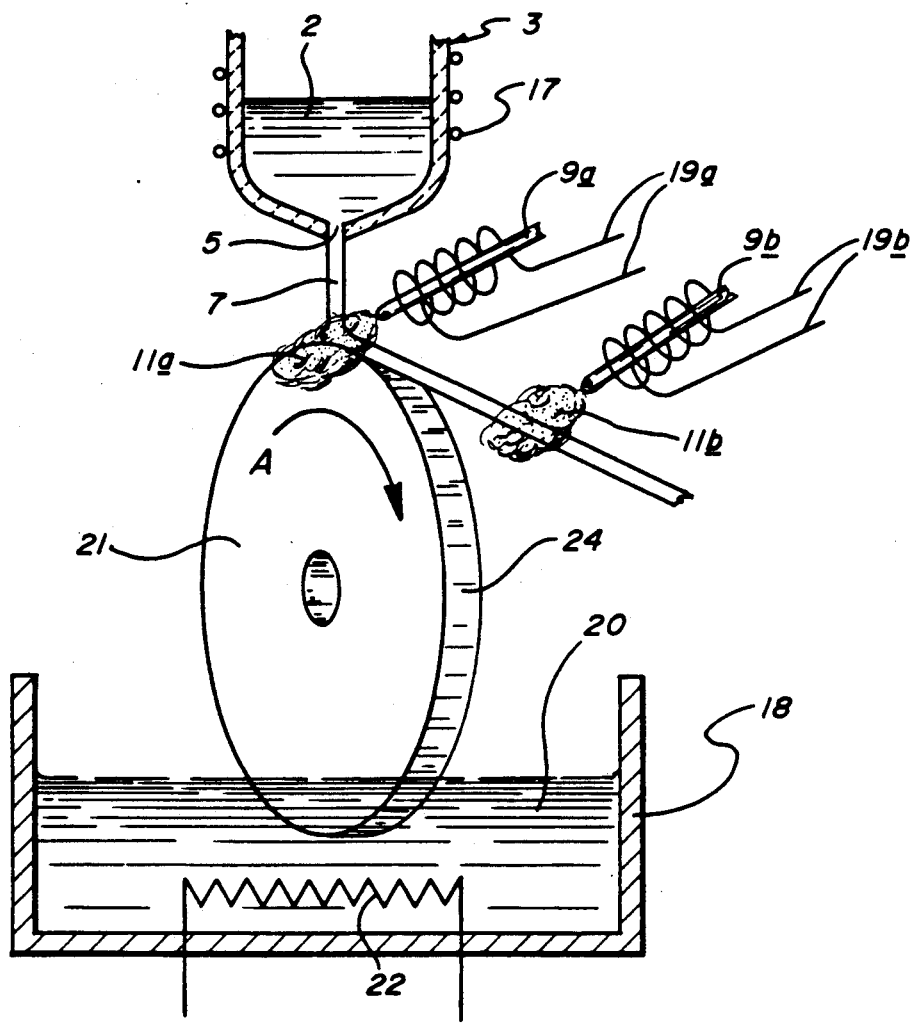
FIG. 4B is a schematic, partially perspective and partially cross-sectional view of a first liquified material streaming forth from an aperture formed in the bottom surface of a crucible and a second liquified stream picked up from a bath by the peripheral surface of a wheel, said streams interacting adjacent the surface of the wheel with first and second energetically introduced species.

Referring now to FIG. 4B, there is shown apparatus adapted for the practice of another preferred embodiment of the instant invention. The apparatus of FIG. 4B is generally similar to the apparatus of FIG. 4A, and like elements will continue to be referred to by like reference numerals. Where the apparatus of FIG. 4B differs from that of FIG. 4A is in the inclusion of provisions for introducing further components into the body of a synthetically engineered material as that body is fabricated and the use of the wheel for more than a quench surface.

The apparatus of FIG. 4A includes a wheel 21, a crucible 3 having an inductive heating coil 17 associated therewith and a first nozzle 9a. These elements are generally similar to those depicted in and described with respect to the foregoing figure and need not be elaborated upon. The apparatus of FIG. 4B further includes a container such as a vat 18 adapted to hold a bath of liquified material 20 therein. As illustrated, the vat 18 includes a resistive heater 22 for maintaining the temperature of the liquified material 20. The apparatus further includes a second nozzle 9b having an energy source such as an inductive coil 19b associated therewith. The second nozzle 9b is generally similar to the first nozzle 9a and is also adapted to subject the stream or body of liquified material 7 to a modifier material.

The function of the apparatus of FIG. 4B can best be described with reference to the preparation of a typical synthetically engineered material, in this case a tin and zirconium doped silicon glass member. In preparation for the process, the crucible 3 is first charged with high purity silicon and the induction coil 17 is energized so as to melt the charge of silicon 2 therein. The first nozzle 9a is adapted to provide a flux of energized oxygen and the second nozzle 9b is adapted to provide a flux of energized hydrogen. The wheel 21 is provided with a peripherally extending contact surface 24 formed of, or clad with, zirconium. The vat 18 is filled with tin tetrachloride 20.

In operation, the wheel 21 is rotated through the vat 18 of tin tetrachloride 20 and in passing therethrough picks up a stream of tin-containing material on the surface 24 thereof. The molten silicon is ejected from the aperture 5 in the bottom of the crucible 3 into a fluidic stream 7 and onto the peripheral surface 24 of the wheel 21. This molten silicon stream 7 interacts with both the zirconium wheel surface 24 and the tin tetrachloride present thereupon so as to incorporate those materials into the host matrix of the silicon compound for purposes of alloying, doping and/or modifying same. The molten silicon, having tin tetrachloride and zirconium incorporated into the matrix thereof is subjected to the plasma 11a of energized oxygen from the first nozzle 9a, which oxygen converts the silicon into a body of silicon dioxide incorporating zirconium and tin tetrachloride therein. The thus formed silicon dioxide body (complete with the aforementioned additions) is next subjected to the effects of the plasma 11b of energized hydrogen emitted from the second nozzle 9b, said hydrogen adapted to diffuse into the silicon dioxide body, reducing the tin tetrachloride to free tin. In this manner, a body of silicon dioxide having zirconium and tin incorporated therein is prepared.

Obviously this process could be modified by one skilled in the art without departing from the spirit and scope of the instant invention. For example, molten tin may be substituted for the tin tetrachloride in the vat, in which case the heater 22 would have to be energized to maintain the tin in its liquid state. In such an embodiment, the inclusion of activated hydrogen for purposes of reducing the tin tetrachloride would not be necessary. In another alternative embodiment of this process, the wheel 21 could include a peripheral surface 24 made of, or clad with, tin and the vat 18 could contain a zirconium based compound such as a zirconium halide. In still other embodiments, the vat 20 and/or the wheel 21 could be maintained at elevated temperatures so as to facilitate the reaction of the components which combine to form the synthetically engineered material. Furthermore, and as described previously, the position of the nozzles 9a and 9b could be varied so as to alter the material being fabricated.

The process described with reference to FIG. 4B could be readily adapted for the fabrication of many materials other than silicon dioxide-based materials. Furthermore, the basic process illustrated in FIG. 4B may be expanded or simplified to meet various needs. For example, the vat 18 could be eliminated and the surface of the wheel 24 relied upon solely for the introduction of the components which combine to form the body of engineered material. Alternatively, the wheel 21 could be inert to the process and the vat 18 solely relied upon for component introduction. In some instances, the surface 24 of the wheel 21 may not provide a component of the body being fabricated, but could be made to act as a catalyic surface for facilitating interaction of the components. For example, the wheel surface 24 may be formed of iron, noble metals, ceramics, cermets, or other catalytic materials particularly adapted to enhance interactions thereupon. Furthermore, the apparatus of FIG. 4B may be employed without the crucible 3. In such embodiments, the wheel 21 will suffice to provide a fluidic stream of the first component 20 from the vat 18, which stream will then be subjected to second and succeeding components from the nozzles 9a and 9b. Still further, the apparatus of FIG. 4B may be modified to include additional nozzles for providing additional components of the engineered material.

In other alternative embodiments, the quench wheel may be replaced by a moving surface, such as a belt, a drum, or a roller or set of rollers. A plurality of moving surface may be provided, thereby permitting the synthesis of multilayered material. A spray may be used to provide a fluidic component in contact with a portion of the moving surface.

III. THE SYNTHESIS OF MULTILAYERED MATERIAL

Figure 5:
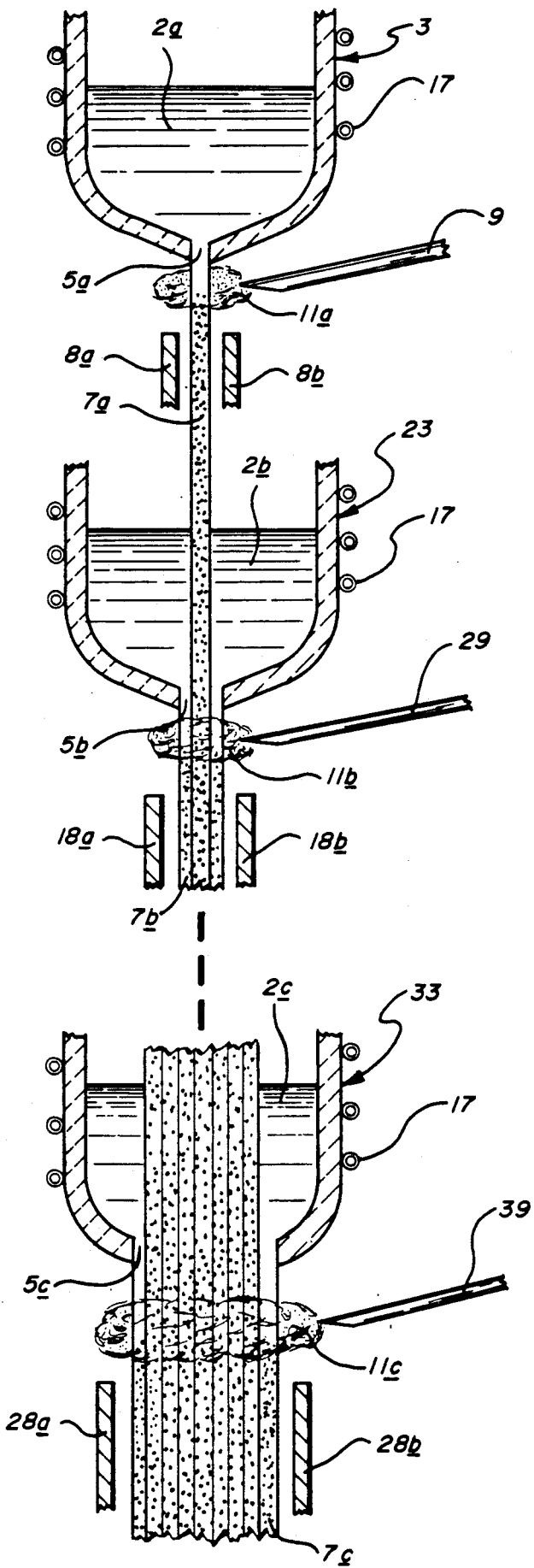
FIG. 5 is a schematic, cross-sectional view illustrating a first deposition station which includes the crucible and stream of liquified material depicted in FIG. 1 and further depicting the utilization of successively arranged stations including similar deposition structures adapted for the fabrication of multi-layered modified materials.

Referring now to FIG. 5, said figure depicts a multi-deposition station apparatus as operatively disposed for fabricating a relatively thick body of synthetically engineered solid material. The apparatus includes a first crucible 3, generally similar to the crucibles described in the foregoing text, said crucible having associated therewith at least one nozzle 9 for discharging an energized modifying component. The apparatus further includes a second crucible 23 operatively disposed downstream of said first crucible 3 and having at least a second nozzle 20 similarly associated therewith. As indicated by the break line, the apparatus may include any number of additional deposition stations associated therewith. As shown herein, the final station comprises a third crucible 33 operatively disposed downstream of said second crucible 23 and having at least a third nozzle 39 associated therewith.

The apparatus illustrated in FIG. 5 has been found to be particularly advantageous when large bodies of engineered material are to be prepared by the sequential accretion of thin film layers of that material. Apparatus such as that depicted in FIG. 5 is also very useful in preparing multi-layered structures comprising thin film layers of differing composition, e.g., graded, alloyed or doped composition. The operation of the apparatus is an extension of the principles described in the foregoing examples, and accordingly, the various modifications elaborated with respect thereto may similarly be applied to the apparatus of FIG. 5.

In operation, the first crucible 3 is loaded with the first component of the engineered material and heated by coils 17 to eject a fluidic stream 7a through the shaped aperture 5 formed in the bottom surface thereof. As in the foregoing examples, the fluidic stream of the first component is subjected to a plasma 11a formed of an energized, diffusable second component of the energized material ejected from the first nozzle 9. The second component diffuses into and interacts with the fluidic stream 7, thereby forming the body of synthetically engineered material.

The body of engineered material formed at the first deposition station serves as a first core material for the subsequent accretion of thin film layers in the downstream stations of the apparatus. As depicted in FIG. 5, the body of engineered material, referred to henceforth as the core, passes into and through the second crucible 23, which crucible contains a charge of the first component. It should be noted that the core, owing to its interaction with the second component has been transformed into a higher melting point material than the first component and thus may pass through the molten body within the second crucible 23 without being liquified or otherwise degraded. As the core exits the second crucible 23, a fluidic stream 7b of the first component from the charge is deposited about the core. This fluidic stream interacts with a plasma 11b formed of a second component of the engineered material emanating from the second nozzle 29, said interaction resulting in the deposition of an additional layer of the engineered material 7b about the core.

It should be obvious at this point that by sequentially repeating the foregoing steps, relatively large bodies of synthetically engineered material may be built-up. This is further shown with reference to the final crucible 33 of the apparatus of FIG. 5 which is adapted to supply the first component 2c for interaction with the plasma 11c of the energized second component for depositing final layer 7c about the multilayered core ejected from the crucible.

It should be noted that as the body of engineered material grows larger in size, additional nozzles may need to be operatively associated with crucibles at succeeding downstream deposition stations in order to fully envelop the fluidic stream with a sufficient quantity of the energetic second component. While the foregoing description of FIG. 5 related to a body of synthetically engineered material of substantially homogenous composition throughout the bulk thereof and fabricated by utilizing identical first and second components in each of the crucibles and the nozzles, the process may obviously be varied to produce successively deposited layers of differing composition. For example, as the core passes from the first crucible 3, it may be conveyed to a second crucible 23 having a molten material present therein which differs from the molten material present in the first crucible 3. In this manner multi-layered heterogeneous structures may be fabricated.

It should be noted at this point that the cross-sectional configuration of the aperture 5 in the crucible will control the cross-sectional geometry of the body of synthetically engineered material emanating therefrom. In this manner, bodies of various cross-sectional configuration may be fabricated. In some instances it would be desirable to have a body of substantially regular cross-sectional shape, such as a circular, rectangular or oval shape i.e. a symmetrical convex shape in more mathematical terms. In other instances it may be desirable to have a body of substantially irregular cross-sectional shape i.e. a non-convex shape which may even be asymmetric, such as an I-beam shape, for purposes of enhancing catalytic activity, increasing surface area or increasing surface strength. Note, that in order to effectuate such regular or irregular shaping, only the first crucible 3 need have the aperture 5 configured in a particular cross-sectional shape. At succeeding stations, the core produced in the first chamber will act as a template for the accretion of subsequent layers thereupon, thereby producing a large body having the desired cross-sectional configuration.

Figure 6:
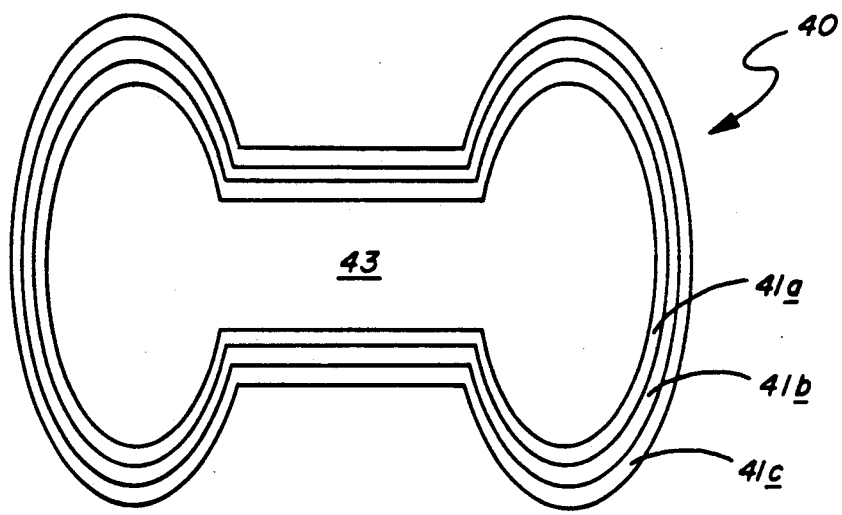
FIG. 6 is a top plan view of an irregularly shaped, multi-layered structure deposited in accordance with the principles of the instant invention and fabricated through the use of deposition apparatus such as illustrated in FIG. 5.

Referring now to FIG. 6, there is depicted therein the cross-section of a body of synthetically engineered material having an irregular cross-sectional configuration, which configuration has been selected to increase the strength thereof. The FIG. 6 illustrated shows how the accretion of successively deposited layers serves to build-up the geometric size of the body. The body of synthetic material 40 illustrated in FIG. 6 is of a generally bow-tie cross-sectional shape (analagous to an I-beam) and includes a plurality of successively deposited layers 41a–41c surrounding the core layers 43. The various layers 41a–41c which cooperate with the core layer 43 to form the body may be formed of similar composition or they may each be of varied composition. In some instances, it may be desirable to alternate layers of relatively hard materials with layers of lubricious or flexible material so as to arrive at a composite body of symmetrically engineered material which material exhibits the advantageous (but non-analogous) properties of hardness, flexibility and lubricity. By controlling the amount of diffusion, graded layers may similarly be deposited, said layers grading from highly metallic compositions to highly ceramic compositions.

Note, as being generally applicable to all of the foregoing figures, the fact that the fluidic stream of the first component of the engineered material is of a lower mass than the symmetrically engineered body of that material because the second component has been added to that stream. Due to the laws of conservation of momentum, this factor must be accounted for in the movement of the streams. Since the stream of the first component is ejected from a crucible 3, such as that of FIG. 1, and then interacts with the second component, the body of synthetically engineered material produced therefrom will be heavier (have a greater mass) than the stream emanating from the crucible. Consequently, the body of synthetic material will tend to travel at a lower rate of speed than the fluidic stream (this is true because $m_1 v_1$ must equal $m_2 v_2$). This effect, if ignored, could cause splattering. bunching, clumping or other non-uniform flow of the first fluidic stream.

In order to overcome these deleterious effects, additional momentum must be provided to the body of synthetical material as it is proceeds from the deposition station. This may be accomplished in numerous ways. One of the most expedient ways (and as previously explained) would be to project the second component of the engineered material from the nozzle at a sufficient velocity and at a proper angle so as to impart additional momentum to the stream of synthetic material. This could be accomplished relatively easily by angling the nozzle with respect to the stream ejected from the crucible. In other instances, the stream of the synthetically engineered material will be drawn from the deposition station onto a take-up reel or drum (as illustrated in FIGS. 7A–7D). By controlling the speed and torque of the drum, sufficient momentum can be conveyed to the stream to prevent the aforementioned flow problems. In those instances where a rapidly rotating chill wheel is used, such as illustrated with reference to FIG. 4A, the wheel may also serve the function of imparting, sufficient momentum to the stream to obviate the aforementioned problems.

The apparatus described with reference to the drawings may be advantageously employed to fabricate a wide variety of synthetically engineered materials. Particular utility will be had in the preparation of higher melting compounds such as ceramics and glasses from lower melting components thereof, such as melts, semiconductors and the like. For example, the apparatus of the instant invention may be employed to prepare bodies of alumina from aluminum metal and oxygen, or to prepare bodies of titania from titanium. Similarly, aluminum nitride and titanium nitride may be prepared by controlling the amount of diffusion. Further, interesting composite materials such as aluminum-alumina materials, titanium-titania materials, or zirconium-zirconia materials (to name but a few) may be fabricated. These materials have many potential uses as reinforcing fibers, heat resistant materials, electrically conductive ceramic type materials and so forth. It is anticipated that one skilled in the art of material science would be readily able to adapt the processes disclosed herein to prepare a wide variety of synthetically engineered materials of homogeneous compositions as well as of composite and multi-layered compositions having unique optical, electrical, chemical, thermal and structural properties.

IV. ACTIVATION OF THE COMPONENTS

As mentioned previously, various types of energy may be utilized in accordance with the principles of the instant invention to activate the various energetic gaseous components of the material being synthesized. FIGS. 7A-7D are illustrative of some such excitation methods.

Figure 7A:
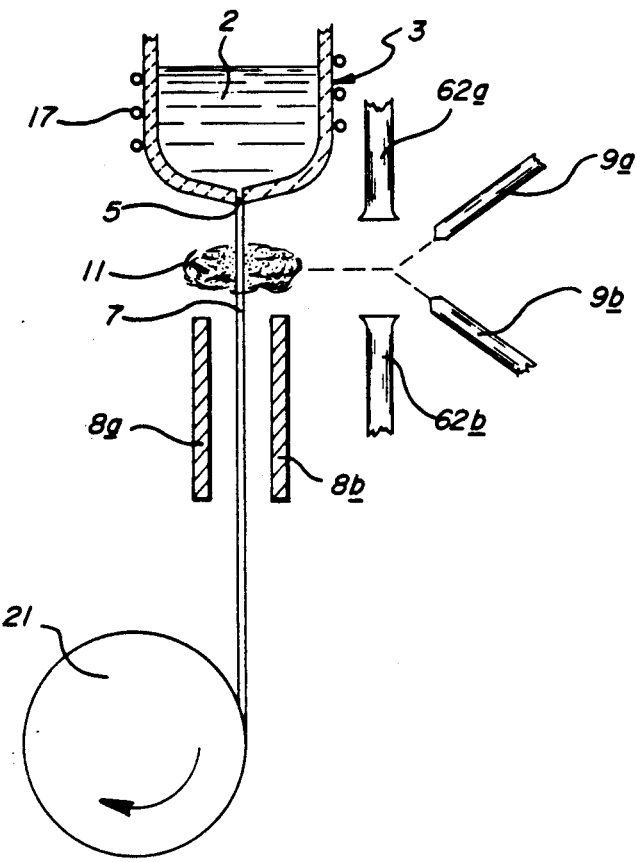
FIGS. 7A-7D are schematic, cross-sectional views of different means for energizing the gaseous components emanating from the nozzles depicted in FIG. 3.

Referring now to FIG. 7A, there is shown an apparatus, generally similar to that of FIG. 1, including therein a crucible 3 heated by an induction coil 17 as adapted to prepare a fiber 7 of synthetically engineered material. While also illustrated in the figure is a take-up reel 60 adapted to collect and wind the fibers 7, FIG. 7A is predominantly intended to illustrate the use of microwaves to excite the components of the engineered material emanating from the nozzles 9a and 9b. To that end the apparatus includes a pair of spaced microwave horns 62a and 62b disposed so as to direct microwave energy toward a stream of gaseous reactive components emanating from the two nozzles 9a and 9b. The microwave horns 62a and 62b are typical microwave sources, or alternatively free radical generators such as "Woods' horns" as are well known to those skilled in the art. Of course, the horns are operatively connected to a source of microwave energy (not shown). The use of microwave horns provides one particularly advantageous embodiment because the highly active energy transmitted therefrom activates an order of magnitude more species than does radio frequency energy.

The gaseous components exiting from the nozzles 9a and 9b pass through the field of microwave energy and are excited so as to create a plasma 11 therefrom, which plasma 11 interacts with the primary component in the fluidic stream 7 exiting from the crucible 3. As illustrated, the apparatus further includes a pair of radio frequency energized electrodes 8a and 8b, as previously discussed, said electrodes disposed to provide additional energy to the fiber 7 for the purpose of maintaining an optimum temperature of the fluidic stream and further facilitating the interaction of the component thereof.

Figure 7B:
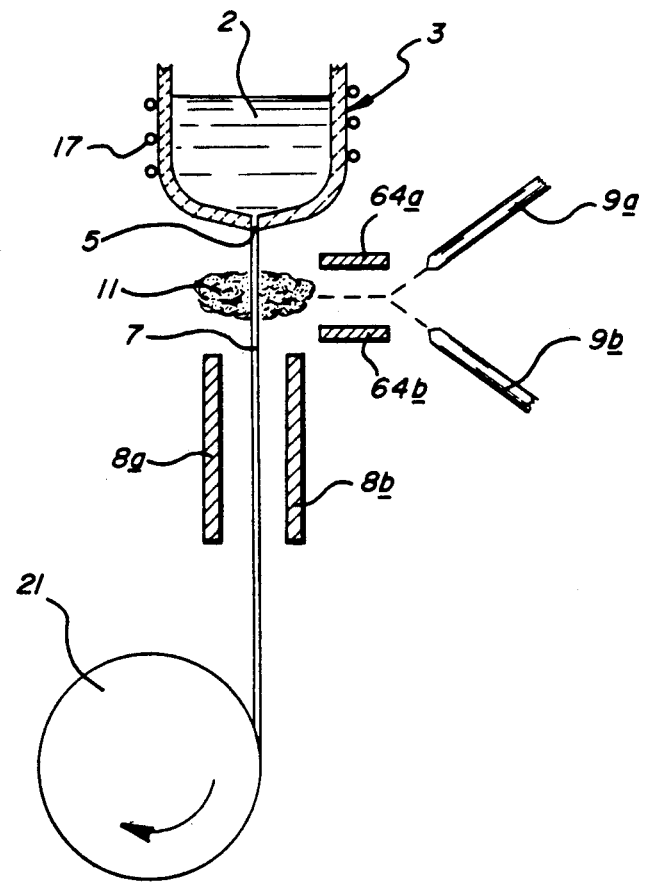

Referring now to FIG. 7B, there is shown apparatus generally similar in operation and structure to that of FIG. 7A; however, energization of the gaseous components of the engineered material in this instance is provided by a pair of radio frequency energized electrodes 64a and 64b operatively disposed proximate the stream of gaseous components ejected from the nozzles 9a and 9b. As with the microwave energy embodiment, the radio frequency energy excites the gaseous components to form a plasma 11 therefrom, which energetic plasma facilitates the interaction of those components into the host matrix of the first component.

Figure 7C:
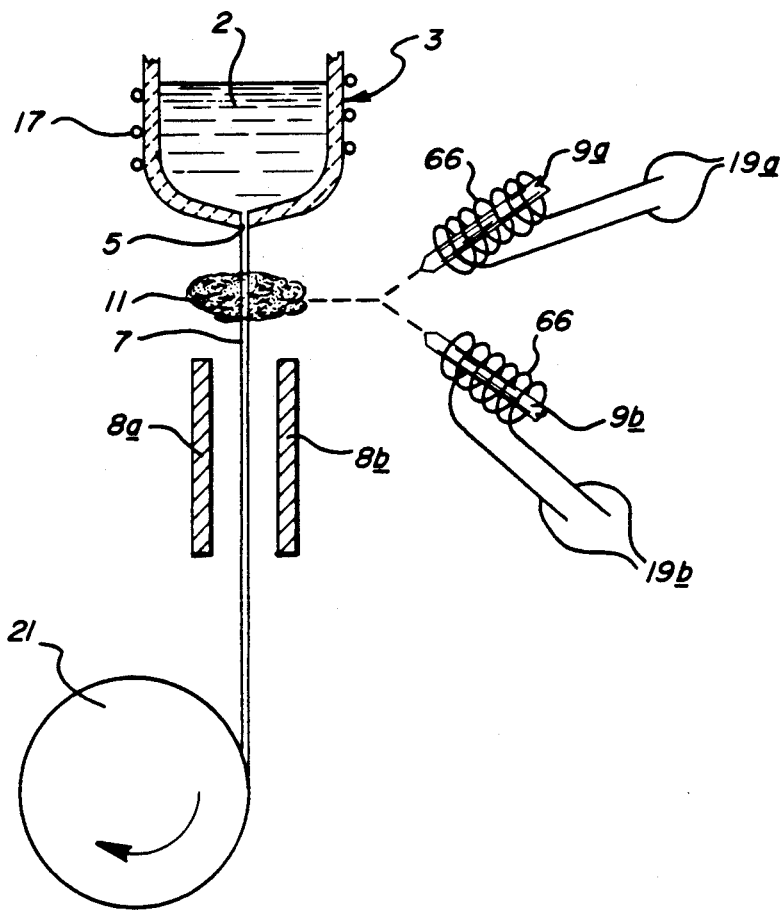

FIG. 7C illustrates apparatus for thermally activating the gaseous components of the engineered material. As is shown in FIG. 7C, each of the two nozzles 9a and 9b has associated therewith a coiled resistance heating element 66 for providing thermal energy to the gaseous components ejected from the nozzles 9a and 9b. Although not shown in the figures, the nozzles 9a and 9b could also be modified to include therein a catalytic body such as a body of platinum or palladium for purposes of catalytically activating the gases passing therethrough.

Figure 7D:
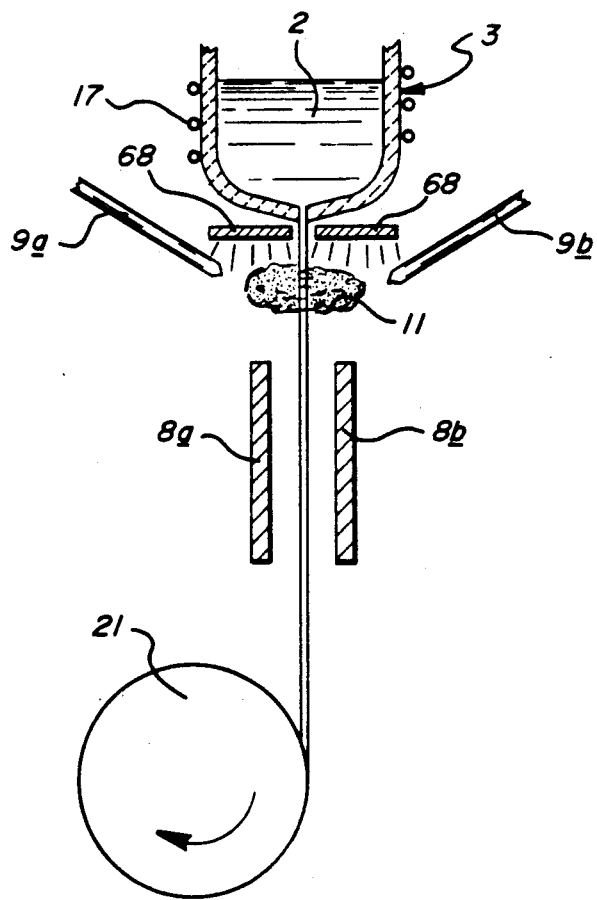

Referring now to FIG. 7D there is shown apparatus adapted for the photochemical activation of the gaseous components provided by the nozzles 9a and 9b. The apparatus of FIG. 7D includes a pair of light sources 68 operatively disposed so as to illuminate the components exiting from the nozzles 9a and 9b. The light source most typically provides high intensities of wavelengths suitable for the activation of the component material. It may include well known photochemical sources such as mercury vapor lamps, sodium lamps, arc lamps, and lasers.

V. THE PRODUCTION MACHINE

Figure 8:
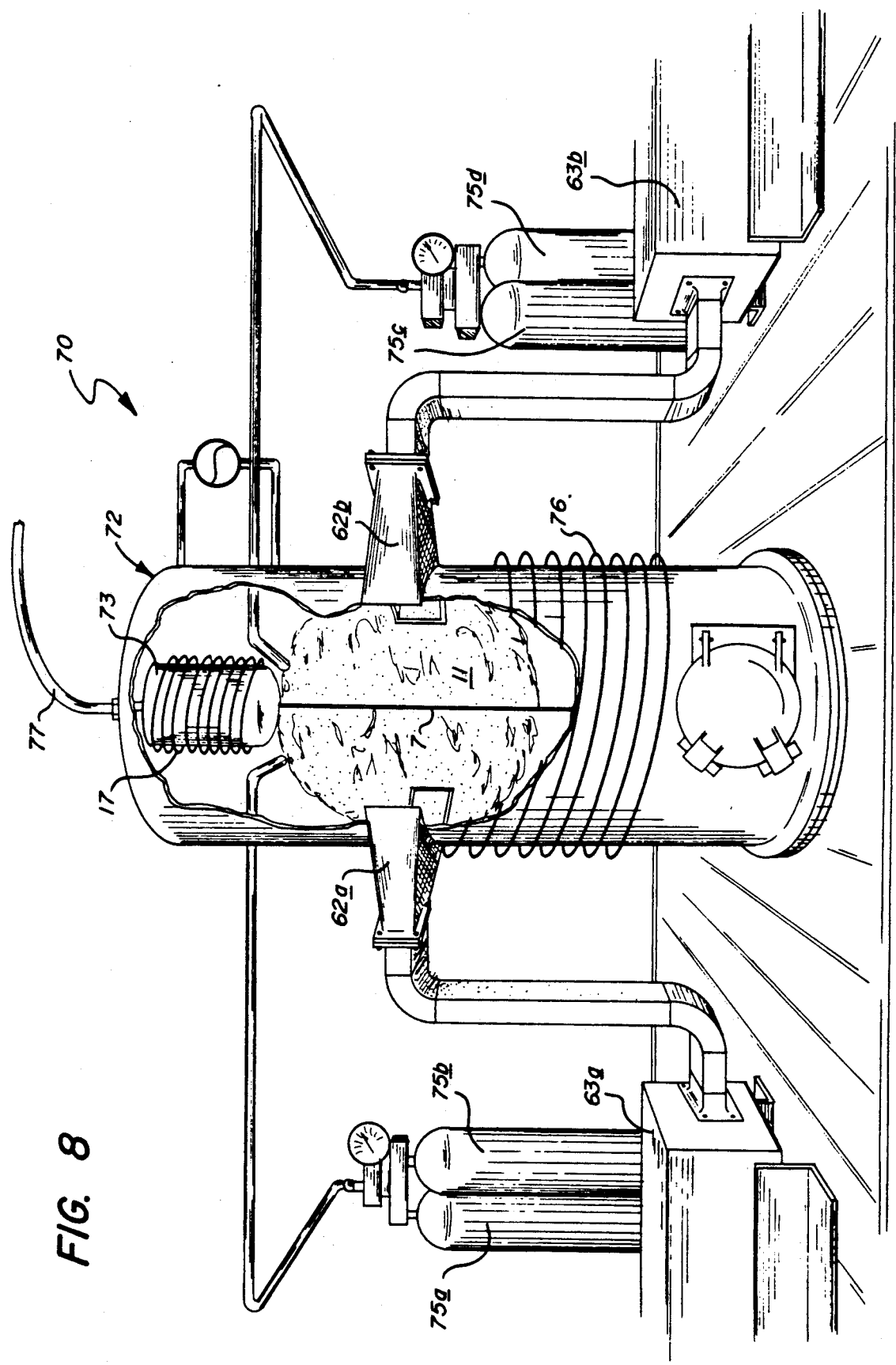
FIG. 8 is a perspective view of an installation specifically adapted for the high volume fabrication of synthetically engineered materials, said installation incorporating the components of the deposition apparatus illustrated in FIGS. 1-7.

Referring now to FIG. 8, there is shown a perspective illustration of Applicants' present plans for a high volume production plant in which the inventive concepts of the instant invention have been implimented. In this drawing, the reactor assembly, indicated generally by the reference numeral 70, includes a reaction vessel 72 in which the synthesis of the atomically engineered material occurs. The large scale vessel 72 further includes a crucible (not shown) disposed internally of a housing 73 which is heated by an induction coil 17. The components of the material being fabricated within the reaction vessel 72 are, in this instance, energized by microwave energy provided thereto by the spacedly disposed microwave horns 62a and 62b, which horns are operatively connected to microwave power supplies 63a and 63b, respectively. As the gaseous components of the engineered material are delivered from one or more of the pressurized tanks 75a, 75b, 75c and 75d, they are activated by microwave energy transmitted from the horns 62a and 62b, which energy transforms those components into highly energetic species represented by plasma cloud 11. Note that the energy further serves to maintain the fluidic stream 7 of the first component ejected from the crucible in an activated state so that interaction between the two or more components is enhanced. The entire reaction vessel may be heated or cooled by temperature moderating coils 76; and it may be pressurized or evacuated via pressure line 77, depending upon the nature of synthetic material being engineered.

VI. FABRICATION OF TRANSMISSIVE OPTICAL FIBERS

It should be noted that the principles of the instant invention have particular advantage not only in the preparation of modified forms no conventionally accepted ceramic materials, but also in the preparation of fiber optic materials. Both of these types of synthetically engineered materials fall within the aforedeveloped definition of "atomic ceramics". As is well known to those skilled in the art of fiber optics, present technology for the preparation of fiber optic elements is a well developed multi-step process, the essential steps of which have remained virtually unchanged since the inception thereof. Typically, a preform member is fabricated by the consolidation of high purity starting materials, of carefully selected refractive indices, into a desired rod-like configuration. The preform member is then heated to its softening point and pulled into a thin fiber. Following the pulling step, the fiber is generally treated to (1) modify the refractive index of the outer layer therof, (2) temper or rigidify the exterior surface of the fiber and/or (3) clad the fiber with a protective coating. To say the least, this is an exacting process which requires the precise control of all parameters if a fiber characterized by low light loss is to be obtained. The typical preform is six inches or less in length and, through the aforementioned pulling process, yields fibers of up to a kilometer in length.

It would obviously be desirable to eliminate this type of batch processing. By utilizing the principles of the instant invention, it is possible to produce fiber optic elements of great lengths in a continuous process. Typical fiber optical elements include a core, a cladding layer upon the core and a protective outer sheathing layer. The core is the element which conveys light and, accordingly, is formed from a material which is highly transparent to the wavelength of light being transmitted. For optical transmissions in the visible and near infrared regions, core materials of silicon oxide, germanium oxide, zirconium oxide and other similar oxides, taken singularly or in combination, are employed.

The cladding is formed from a material compatible with the core material but having a refractive index differing therefrom. The refractive indices of the core and the cladding are chosen so as to restrict the transmission of light from the interface of the core and cladding, thereby confining the transmitted light to the core region of the fiber by the phenomenon of total internal reflection. Parameters for the selection of the refractive indices of the two materials are well developed and are known to those skilled in the optical fiber art. It is generally required that the core have a higher refractive index than the cladding layer if light is to be prevented from escaping the core. Frequently, the core and the cladding layer are fabricated from the same material such as silicon dioxide; however, the core will have its refractive index increased by the addition thereto of a multivalent metal oxide, such as an oxide of tantalum, tin, niobium, zirconium, aluminum, lanthanum, germanium or boron.

In addition to providing the correct refractive index relative to the core, the cladding layer serves to increase the durability of the fiber. Toward this end, the cladding layer may have an additional element or elements added thereto for purposes of increasing the strength and limiting the permeability thereof. These durability increasing elements may be added to the entire bulk of the cladding layer or just to the exterior surface thereof. Such durability increasing elements can be selected from, for instance, carbon, nitrogen or fluorine when the cladding layer is formed of silicon or germanium oxide based materials.

In some instances it is desirable to vary the refractive index of the core so as to confine light to the central portion thereof. When such a graded index core is utilized, light is effectively and smoothly steered to the center of the fiber before it even reaches the interface with the cladding layer. The gradation of the index may be either continuous or stepped, and again, the utility of such graded index fibers is well known to those skilled in the art. Heretofore the fabrication of graded index fibers has necessitated precise control of the gradation profile. However, this control is difficult to attain in the preform processes. By utilizing the principles of the instant invention, however, such refractive index gradation may be precisely and simply attained by controlling the diffusion of an index modifying material into the host matrix of a fiber.

In most instances, the fiber optic element is provided with a further hermetic protective layer outside the cladding layer for purposes of (1) eliminating leakage of light into the fiber, which leakage would result in crosstalk in a communication system and (2) further increasing the strength and integrety of the fiber. Such hermetic layers are typically relatively thick, durable layers formed of glassy, ceramic or other durable materials.

There are many fiber optic systems currently in use and under investigation. It should be obvious to one skilled in the art of fiber optic device design and fabrication that the instant invention confers many advantages in the preparation of such fibers insofar as it provides for: (1) the preparation of relatively high melting ceramic, glassy and other inorganic materials via processes which eliminate principle sources of contamination; (2) more precise control of the composition of the concentric layers; (3) enhanced control of the refractive indices; and (4) improved control of all other physical properties of materials. Furthermore, the instant invention can be utilized to provide extremely long fibers which contain a fiber optic core, cladding and a protective layer in a unitary, continuous process.

For example, an optical fiber may be prepared according to the principles of the instant invention by ejecting a stream of molten silicon at a first deposition station and subjecting that silicon stream to an activated stream of oxygen gas in an apparatus generally similar to that illustrated in and described with reference to FIG. 1. In this manner, a fiber of high purity silicon dioxide material may be prepared without necessitating the melting of the silicon dioxide in a crucible. As is known and appreciated by those skilled in the art, glass forming materials such as silicon oxides, germanium oxides and the like are high melting materials and also extremely good solvating agents for a wide variety of ions. Accordingly, contamination of such materials in a crucible is a serious problem, whereas precursor materials of these oxides typically melt at substantially lower temperatures and have poorer solvating properties. Accordingly, the principles described herein provide for the elimination of contamination of the glassy material by forming it in a crucible-free environment.

As described hereinabove, the principles of the instant invention are advantageously employed to fabricate a high purity silica fiber; however, the instant application confers still further advantages to the process of fiber optic fabrication insofar as the host matrix material from which the fiber is fabricated may be readily layered, doped, alloyed, modified or graded. As should be obvious at this point, by supplying an additional source of the material to the process sequence, the thus prepared silica fiber may be further modified so as to have, e.g., the refractive index thereof graded or to provide cladding layer thereupon.

In order to vary the refractive index of any one of the layers of the fiber, an additional nozzle or other source of index modifying agent, such as shown in FIG. 3, may be employed to direct the additional agent to the liquified silica fiber as it is being processed. For example, a gaseous source of carbon, such as carbon tetrafluoride, or a source of a multivalent metal such as tin tetrachloride, may be employed. These additional reagent materials may be mixed with the oxygen gas and directed onto the silicon stream from a single source or they may be directed from a separate source, either simultaneously or sequentially with the oxygen. By controlling the concentration and composition of the sources of these refractive index modifiers, by controlling the background pressure and by controlling the temperature of the fiber as it is being formed, the diffusion of these components through the silicon and/or silicon oxide material may be repeatably controlled so as to precisely grade the index of refraction of the fiber.

The principles of the instant invention may be also utilized to provide a cladding layer upon the fiber. As mentioned previously, it is desirable that the cladding layer have a slightly lower index of refraction than does the core layer so as to facilitate retention of light therein. In the silica based optical fiber system, the core may have a typical refractive index of 1.466 and the cladding an index of 1.458. Such refractive index profiles may be readily attained in the instant invention by the inclusion of small amounts of halogens, such as chlorine or fluorine, in the matrix of the silicon oxide material. Such inclusion may be readily accomplished in accordance with the principles disclosed herein by, for example, ejecting a liquified stream of silicon, subjecting the stream to an activated oxygen-containing atmosphere to form silicon dioxide therefrom and sequentially subjecting the silicon-oxide fiber to an atmosphere of the activated halogen under conditions favoring diffusion of the activated halogen only partially through the silicon dioxide fiber. In this manner, a cladding layer of lowered refractive index will be formed upon the higher index core.

The cladding layer may be formed in a multi-station process such as that illustrated in and described with respect to FIG. 5. In some instances, the core fiber formed in the first station will be deposited upon a subsequent station where an additional layer of the first component of the cladding, typically germanium or silicon, will be added to the core and subsequently subjected to an atmosphere containing reactants, such as activated oxygen and halogen, said reactants adapted to form the cladding layer thereupon. Such multi-station coating may be employed to form a protective layer about the core-cladding composite so as to form a finished fiber optic element. There is a wide selection of protective coating materials also which are preferably employed, including ceramic coatings, glassy coatings and even organic polymeric coatings. The instant invention may be used to deposit any of such coatings.

From the foregoing, it should be apparent that the instant invention is particularly suited for the fabrication of fiber optic elements due to the fact that the disclosed process may be employed to fabricate multi-layered structures, particularly concentric multi-layered fibers. Such coaxial optical fibers may be fabricated with materials having widely diverging optical properties, and as such, offer designers of fiber optic elements the ability to fabricate unique devices. For example, a single fiber may comprise many concentric transparent layers separated from one another by a cladding layer and an opaque layer. Such a single fiber may thereby transmit in parallel many separate data streams.

It should be noted that while the description of the utility of the instant invention for the fabrication of fiber optic elements has been made with reference primarily to germanium and silicon based materials, such description was solely intended for purposes of illustration and is predicated upon the wide commercial utility of such a limited range of materials. The invention, however may be utilized for the fabrication of optical fibers from materials currently not in wide use because such materials may be different to fabricate into fibers or may be unattainable in pure form. Among such materials are fibers of semiconductor materials having a band gap which provides high degrees of transparency in the infrared region of the spectrum. Among these materials are chalcogenide materials, Group IV semiconductors and Group III-V type semiconductors. Note that as to fiber optic compositions, response characteristics, refractive indices, thicknesses, etc. may be obtained and better understood from U.S. Pat. No. Re. 28,028 reissued June 4, 1974 and assigned to Corning Glass Works.

Many modifications can be made to the method of the present invention without departing from the spirit and teachings of the subject disclosure. Accordingly, the scope of the invention is only to be limited by the claims which follow.

We claim:

1. A method of fabricating a relatively thick, synthetically engineered solid material, said method comprising the steps of:
   providing a core member adapted to function as a template for the engineered solid material thereupon;
   providing a plurality of deposition stations;
   sequentially directing said core member through said plurality of deposition stations, each of said stations adapted to perform the operations of:
   providing a fluidic stream of a first component of a material to permanently adhere about said core;
   subjecting the fluidic stream of the first component about said core to an energized, diffusible second component of the material presented as a spray or gaseous cloud about said first component;
   diffusing said second component through at least a portion of the fluidic stream, whereby the second component interacts with the first component so as to deposit a layer of a synthetically engineered solid material, exhibiting a range of properties different from the properties of either individual component, upon the core.

2. A method as in claim 1, wherein the step of providing a fluidic stream of a first component about the core comprises the step of providing a fluidic stream of the first component formed from the same material in each of said plurality of deposition stations.

3. A method as in claim 2, further including the step of forming the second component from the same material in each of said plurality of deposition stations.

4. A method as in claim 2, including the further step of forming the second component in at least one of said plurality of deposition stations of a material differing in composition from the material of the second component formed in the remainder of said plurality of deposition stations.

5. A method as in claim 1, including the further step of forming said first component in at least one of said plurality of deposition stations of a material differing in composition from the material of said first component in the remainder of said plurality of deposition stations.

6. A method as in claim 1, wherein the step of providing a fluidic stream of a first component comprises the step of providing a liquid fluidic stream.

7. A method as in claim 1, wherein the step of providing a fluidic stream of a first component comprises the step of providing a stream of an atomized metallic material.

8. A method as in claim 1, wherein the step of providing a fluidic stream comprises the step of providing a stream of an atomized semiconductor material.

9. A method as in claim 1, wherein the step of providing a fluidic stream comprises the step of providing a stream of an atomized ceramic material.

10. A method as in claim 1, wherein the step of subjecting the fluidic stream of the first component to an energized, diffusible second component comprises the step of directing a stream of energized gaseous material to impinge upon the fluidic stream of the first component.

11. A method as in claim 10, wherein the step of directing an energized stream of a gaseous material includes the further step of selecting the energized gaseous material from the group consisting of nitrogen, oxygen, halogens, hydrocarbon gases, hydrogen, vaporized alkaline metals, and combinations thereof.

12. A method as in claim 11, wherein the step of subjecting the fluidic stream of the first component to an energized, diffusible second component, comprises the step of directing the fluidic stream of the first component through a plasma containing the second component.

13. A method as in claim 12, including the further step of ionizing the second component of the synthetic material.

14. A method as in claim 12, including the further step of radicalizing the second component of the synthetic material.

15. A method as in claim 12, including the further step of thermally activating the second component of the synthetic material.

16. A method as in claim 12, including the further step of energizing the second component of the synthetic material by a photoactivation process.

17. A method as in claim 12, including the further step of energizing the second component by a catalytic activation process.

18. A method as in claim 1, including the further step of providing the second component in a high pressure environment.

19. A method as in claim 10, including the further step of directing said energized gaseous stream to impinge upon the fluidic stream of said first component so that momentum is transferred to said fluidic stream of said first component.

20. A method as in claim 10, including the further step of maintaining contact between the fluidic stream and the energized gaseous stream for a sufficient length of time to obtain a desired degree of diffusion of the second component into the fluidic stream of the first component.

21. A method as in claim 1, wherein the step of providing a fluidic stream of a first component in at least one of said deposition station includes the steps of:
melting said first component in a crucible; and ejecting said first component from said crucible in a fluidic stream.

22. A method as in claim 1, wherein the step of providing a fluidic stream of a first component in at least one of said deposition stations comprises the step of ejecting said first component through a nozzle under pressure.

23. A method as in claim 1, wherein the step of providing a fluidic stream of a first component in at least one of said deposition stations comprises the step of allowing said first component to overflow from said crucible.

24. A method as in claim 1, wherein the step of providing a fluidic stream of said first component in at least one of said deposition stations comprises the step of ejecting said first component from an aperture in said crucible.

25. A method as in claim 24, including the further step of providing said aperture with a regular convex shape.

26. A method as in claim 24, including the further step of providing said aperture with an irregular non-convex shape, and interacting said second component with said first component so as to form a synthetically engineered solid material having a corresponding cross-sectional shape, said material adapted to function as the template for the accretion of subsequent layers of synthetically engineered material thereupon in succeeding deposition stations so as to produce a finished article of predetermined cross-sectional shape.

27. A method as in claim 1, further including the step of subjecting said fluidic stream of said first component in at least one of said deposition stations to at least one burst of energy for enhancing diffusion of said second component through at least a portion of the fluidic stream of the first component.

28. A method as in claim 27, including the further step of utilizing electromagnetic energy so as to establish eddy currents within said fluidic stream of the first component.

29. A method as in claim 27, including the further step utilizing thermal energy so as to promote said diffusion.

30. A method as in claim 1, including the further step of subjecting the fluidic stream of the first component in at least one of said deposition stations to an energized, diffusible third component.

31. A method as in claim 30, wherein the step of subjecting the fluidic stream of the first component to the third component includes the further step of providing said third component as an energized, fluidic stream.

32. A method as in claim 30, including the further step of sequentially exposing the fluidic stream of said first component to said second and said third energized diffusible components.

33. A method as in claim 30, including the further step of simultaneously subjecting the fluidic stream of said first component to the second and the third energized, diffusible components.

34. A method as in claim 1, further including the step of directing said fluidic stream of said first component after being modified by said second component onto a quench surface in at least one of said deposition stations.

35. A method as in claim 34, wherein the step of directing said first and second components onto a quench surface includes the further step of rapidly moving said quench surface.

36. A method as in claim 34, including the further step of controlling the temperature of said quench surface.

37. A method as in claim 12, including the further step of forming said plasma with AC energy.

38. A method as in claim 12, including the further step of forming said plasma with microwave energy.

39. A method as in claim 12, including the further step of forming said plasma with DC energy.

40. A method as in claim 1, including the further steps of:
  forming said relatively thick, synthetically engineered solid material as an elongated fiber; and
  collecting said fiber upon a take-up spool.

41. A method as in claim 1 further including:
  forming the core from a fluidic stream of said first component of material; and
  subjecting the fluidic stream of said core to an energized diffusible second component of the material presented as a spray or gaseous cloud about said first component; and
  diffusing said second component through at least a portion of the fluidic stream of said core, whereby the second component interacts with the first component so as to form a core of synthetically engineered solid material, exhibiting a range of properties different from the properties of either individual component.

42. A method as defined in claim 1, wherein said fluid stream of material being selected from the group of metallic materials, semi-conductor materials, and ceramic materials.

* * * * *